US012265979B2

United States Patent
Anderson et al.

(10) Patent No.: US 12,265,979 B2
(45) Date of Patent: Apr. 1, 2025

(54) SYSTEMS AND METHODS FOR PROVIDING COMBINED PREDICTION SCORES

(71) Applicant: SALESRABBIT, INC., Lehi, UT (US)

(72) Inventors: Brady Tate Anderson, Saratoga Springs, UT (US); Zac Kerr, Provo, UT (US)

(73) Assignee: SALESRABBIT, INC., Lehi, UT (US)

( * ) Notice: Subject to any disclaimer, the term of this patent is extended or adjusted under 35 U.S.C. 154(b) by 190 days.

(21) Appl. No.: 17/580,391

(22) Filed: Jan. 20, 2022

(65) Prior Publication Data

US 2023/0230114 A1  Jul. 20, 2023

(51) Int. Cl.
  *G06Q 10/00* (2023.01)
  *G06Q 30/0204* (2023.01)
  *H04L 67/56* (2022.01)

(52) U.S. Cl.
  CPC ......... *G06Q 30/0205* (2013.01); *H04L 67/56* (2022.05)

(58) Field of Classification Search
  None
  See application file for complete search history.

(56) References Cited

U.S. PATENT DOCUMENTS

| | | | | |
|---|---|---|---|---|
| 8,818,838 B1* | 8/2014 | Sharma | ............... | G06Q 30/0202 |
| | | | | 705/7.29 |
| 10,740,404 B1* | 8/2020 | Hjermstad | ............ | G06F 16/909 |
| 11,366,860 B1* | 6/2022 | Hjermstad | ............ | G06F 16/904 |
| 2008/0109759 A1* | 5/2008 | Stambaugh | ........... | G06F 3/0481 |
| | | | | 715/835 |
| 2008/0288312 A1* | 11/2008 | Miles | .................. | G06Q 30/0205 |
| | | | | 705/7.34 |
| 2008/0319829 A1* | 12/2008 | Hunt | .................. | G06Q 30/0201 |
| | | | | 705/7.29 |
| 2010/0082521 A1* | 4/2010 | Meric | .................... | G06Q 10/00 |
| | | | | 706/53 |
| 2012/0330719 A1* | 12/2012 | Malaviya | ........... | G06Q 10/0635 |
| | | | | 705/7.31 |
| 2014/0344186 A1* | 11/2014 | Nadler | ................ | G06Q 10/067 |
| | | | | 705/36 R |
| 2016/0019357 A1* | 1/2016 | Marzula | ................ | G06Q 10/10 |
| | | | | 705/2 |
| 2016/0239749 A1* | 8/2016 | Peredriy | ............... | G06F 16/283 |
| 2019/0317952 A1* | 10/2019 | Li | ........................ | G06F 16/2246 |
| 2023/0209367 A1* | 6/2023 | Chang | ..................... | G06N 5/01 |
| | | | | 455/423 |

OTHER PUBLICATIONS

Juan Ramón Rico-Juan (Machine learning with explainability or spatial hedonics tools? An analysis of the asking prices in the housing market in Alicante, Spain), Expert Systems With Applications 171 (2021) 114590). (Year: 2021).*

* cited by examiner

*Primary Examiner* — Hafiz A Kassim
(74) *Attorney, Agent, or Firm* — Ray Quinney & Nebeker; James Bullough

(57) ABSTRACT

A prediction system provides combined prediction scores for a target geographic zone within a hierarchical geographical model. The combined prediction scores are generated based on correlations between sales data and household attributes. The combined prediction scores are pre-calculated, stored on a database, and transmitted to a client device based on a request from the client device.

20 Claims, 13 Drawing Sheets

SYSTEMS AND METHODS FOR PROVIDING COMBINED PREDICTION SCORES

BACKGROUND

Recent years have seen improvements in data analytics in an effort to try and predict behavior of consumers and other entities of interest. For example, conventional sales prediction systems have attempted to generate correlations between a consumer's purchasing habits and their age, gender, race, income, and so forth. These conventional systems have helped many individuals, organizations, and other entities to target specific products to particular consumers or potential consumers, thereby increasing the effectiveness of sales efforts.

While many conventional systems attempt to predict consumer behaviors without having interacted with specific consumers, these systems suffer from a number of drawbacks and challenges. For example, many systems for predicting behavior rely on statistically meaningful correlations, which often involves processing large amounts of sales and consumer data. Although calculating these correlations can aid in predicting consumer behavior, such systems often fail to operate in an accurate, efficient and/or flexible way. For instance, large amounts of data processing requires a significant investment in processing resources, or a significant amount of processing time using available resources. This may result in delayed results, or predictions that arrive too late for a sales representative to effectively utilize. These delays are further exacerbated when attempting to determine predictions for large numbers of users on the fly, particularly where a client device has limited bandwidth and/or availability to computing resources.

These along with additional problems and issues exist regarding conventional sales performance prediction systems.

BRIEF DESCRIPTION OF THE DRAWINGS

The detailed description provides one or more embodiments with additional specificity and detail through the use of the accompanying drawings, as briefly described below.

FIGS. 3-1 and 3-2 illustrate example schematic diagrams showing features of a machine learning model in accordance with one or more embodiments.

FIG. 5-1 through FIG. 5-3 illustrate a prediction map presented on a graphical user interface in accordance with one or more embodiments.

DETAILED DESCRIPTION

Figure 1:
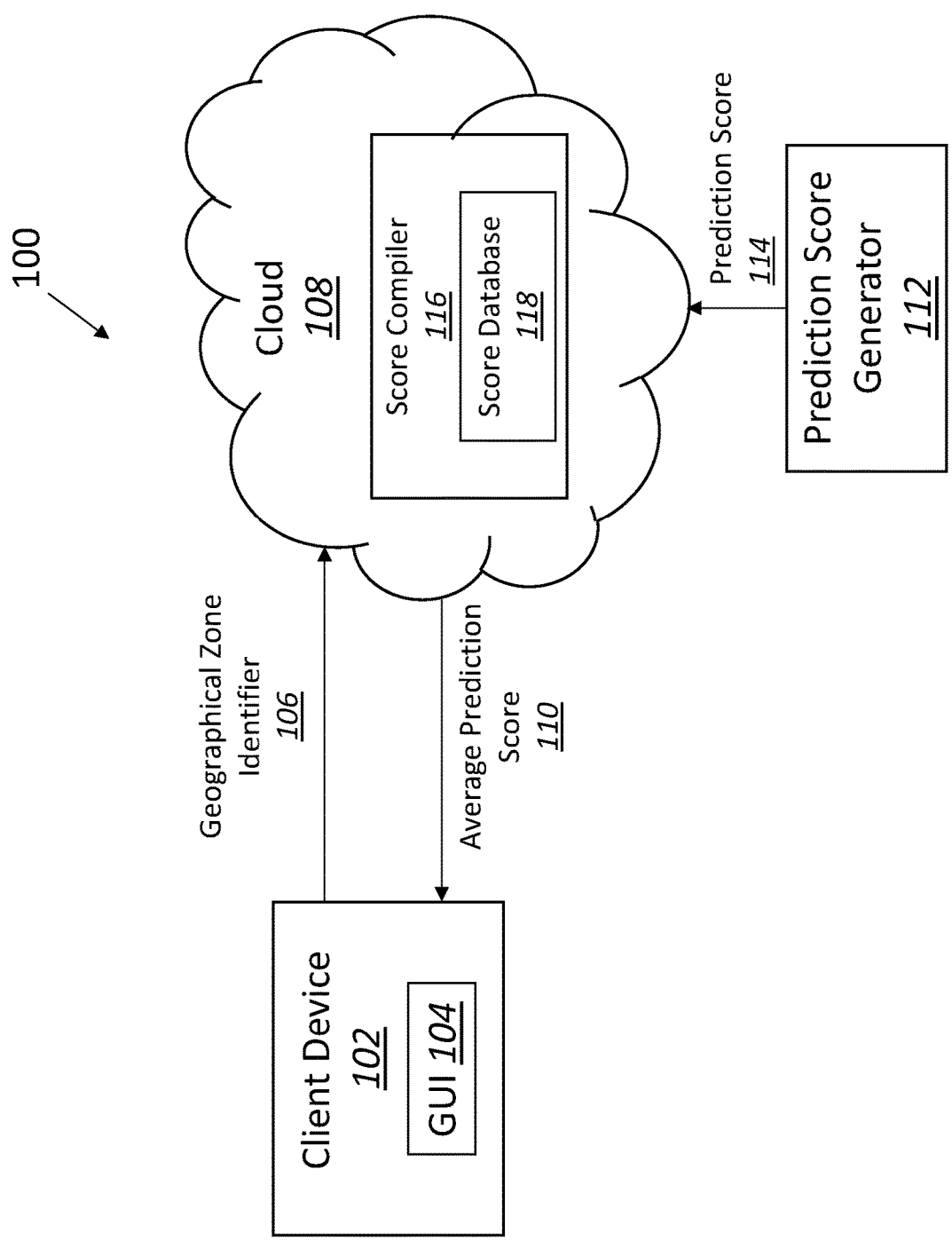
FIG. 1 illustrates a diagram of an environment in which a prediction system can operate in accordance with one or more embodiments.

This application relates to devices, systems, and methods for generating prediction scores that predict consumer behavior based on household attributes. A machine learning (ML) model may correlate sales data with a set of household attributes for individuals that purchased particular products or services. Using the correlations between the sales data and the household attributes, the ML model may generate prediction scores for individual households based on their household attributes. The prediction scores within a geographic area may then be averaged or otherwise combined, and the composite prediction scores may be stored in a database in association with the geographic area. Based on a request from a client device, the combined (e.g., average) prediction score for a particular geographic area may be transmitted to the client device. When the geographic area is presented on a display (such as a map or other display) of the client device, the associated combined prediction score may be displayed, such as in an area on a map outlining the particular geographic area. The calculation and combination of the prediction scores may be performed at a remote server and transmitted to the remote client device, thereby increasing the ease of access to the prediction scores, and reducing the processing requirements by the client device and/or the server at the time of the request.

In accordance with embodiments of the present disclosure, the geographic area may be associated with a hierarchical geographical model. The hierarchical geographical model may include several tiers, each tier having multiple nodes. The nodes may be associated with a geographic zone or geographic area. The area of a set of nodes in a lower tier may be encompassed by a single node in a higher tier. Each node in the hierarchical geographical model may include an averaged prediction score of each household located in the geographical boundaries of the node. This may allow a sales representative to review the prediction score for a particular area with differing levels of granularity based on the tier of the node within the hierarchical geographical model.

In some embodiments, a method for prediction performance, such as sales performance, may be performed by a prediction system or a prediction server. The prediction system may identify a hierarchical geographical model that includes a plurality of geographic zones. The model may include multiple tiers, each referring to a subset of the geographic zones. The prediction system may receive household prediction scores for a plurality of households. The household prediction scores may be based on a plurality of attributes of the households. For each geographic zone, the prediction system may prepare an average prediction score that is based on the household prediction scores for the households that reside within each geographic zone. When the prediction system receives a request from a client device or other computing device, the prediction system may transmit at least one of the prepared average prediction scores. The request may include an index value of the node of the geographic zone, and the prediction system may transmit the prediction score associated with the identified geographic zone.

The present disclosure provides a number of practical applications that provide benefits and/or solve problems associated with the processing requirements of preparing prediction scores. By way of example and not limitation, some of these benefits will be discussed in further detail below.

For example, by transmitting pre-calculated prediction scores from the remote server (e.g., the cloud or other remote server) to the client device, processing for the prediction scores may be offloaded from the remote server. For instance, rather than calculating a prediction or other value using limited computing resources of a client device, systems and methods described herein perform various pre-processing acts for the respective geographic zones of the hierarchical geographical model using server resources (e.g., a cloud computing system). This offloads computations from the client device to the cloud and reduces delays that would be caused by performing the calculations for each household individually on the client device. Moreover, this enables the client device to provide a display of results without maintaining a full record of the prediction scores for potentially millions of households. In some embodiments, pre-calculated values may be pre-loaded on a client device to allow for offline viewing of prediction scores. This may allow a user to access the prediction scores when working "in the field," or without access to reliable high-speed internet.

In addition to reducing the processor load on the client device, embodiments of the present disclosure may pre-calculate the prediction scores and transmit them to the client device upon request. This may help reduce the amount of time the prediction system takes to prepare and transmit a prediction score. For example, the prediction system may pre-calculate and store the prediction scores on a database. When the client device requests a prediction score, rather than calculating the prediction score at the time of the request, thereby delaying the transmission of the requested prediction score, the prediction system may look up the requested prediction score on the database. This may help to reduce or prevent a delay from processing or calculating the prediction score.

In accordance with embodiments of the present disclosure, the prediction scores may be averaged for a geographic area in a series of nodes that are organized hierarchically. This can help to organize the prediction scores in an easily retrievable manner. This indexing further provides a convenient and efficient mechanism to retrieve prediction scores with variable levels of granularity. The prediction scores may be independently calculated for each node of the hierarchical geographical model, which may provide the user with representative prediction scores within a target geographic zone. This may allow the user to target his or her sales or other efforts on geographic zones that may have the highest opportunity for success.

As illustrated in the foregoing discussion, the present disclosure utilizes a variety of terms to described features and advantages of embodiments of an index generation system described herein. Additional detail will now be provided regarding the meaning of some of these terms.

For example, as used herein, a hierarchical geographical model (or simply hierarchical model) provides a structure to organize various geographic zones. In the hierarchical model, and as will be discussed in further detail herein, multiple geographic zones may be categorized into several tiers. One or multiple geographic zones from lower tiers may be encompassed within a single geographic zone from a higher tier. Put another way, a higher-tier geographic zone may have boundaries that encompass at least one, and likely two or more lower-tier geographic zones.

As used herein, a geographic zone or a node may refer to a mapped area with boundaries that include one or more households (or other unit of interest). The terms geographic zone and node may be used interchangeably. A geographic zone may be organized according to any type of boundary, such as governmental boundaries (e.g., nation, state, county, city), census blocks, zip codes, neighborhood boundaries, user- or system-defined (e.g., custom) boundaries, and combinations thereof. As discussed above, the geographic zones may be organized in a hierarchical geographical model, and a single geographic zone may encompass multiple smaller zones. For example, a county geographic zone (e.g., a first tier) may include multiple city geographic zones (e.g., a second tier), which may include multiple neighborhood or sub-division zones.

As used herein, a household may refer to a representation of a single dwelling, residence, house, apartment, condominium, townhome, rowhome, dormitory, or any combination thereof. In some embodiments, the household may be representative of multiple people that reside within the household, such as family members, roommates, cohabitants, partners, and so forth. In some embodiments, a single building may include multiple households, such as an apartment complex. In some embodiments, the household may be representative of a single individual, and a residence or dwelling may include multiple individuals that are identified as households. For example, a husband and wife (or any two spouses) may reside in a single house but may, in some instances, be considered different households for the purposes of this disclosure.

While embodiments of the present disclosure discuss a household in terms of a residence, it should be understood that a household may refer to a wide variety of individuals and other entities. For example, a sales company may target businesses with their products, and a household, as used herein, may include information about a target business, such as revenue, number of employees, employee demographics, business type, product type, and so forth. In some embodiments, a household may include neighborhoods, religious groups, social clubs, educational institutions, any other grouping of people, and combinations thereof. Thus, while one or more examples described herein refer specifically to a residential household, features and functionalities described herein in connection with individual households may similarly apply to businesses, individuals, or other entities that may be represented in a similar fashion as a household as described herein.

As used herein, a prediction score may be a representation of the likelihood of success for a particular household for a particular endeavor. For example, a prediction score may be a metric or other value that provides an indication of likelihood that a particular household may purchase or otherwise convert a sale for goods or services that are offered for sale by a salesman, company, or other entity. The prediction score may be a numeric score, such as a rating out of 10, with 10 being an extremely high likelihood of sales success, and 0 being an extremely low likelihood of sales success. The prediction score may be based on sales data that is correlated with attributes of a household.

As used herein, a household attribute (e.g., an attribute) may be any information or signal about a household and/or the individuals within the household. In some embodiments, attributes may include demographic information, such as name, age, gender, race, sexual orientation, number of residents (including kids), family information (e.g., single parent, extended family), address, phone number, employment, and so forth. In some embodiments, attributes may include financial information, such as approximate income, credit score, home ownership, home value, mortgage status (e.g., amount remaining, interest rate, original loan value, outstanding payments, or fees), equity in home, time in home, and so forth. In some embodiments, attributes may include any other type of information, such as car ownership, car type, home type (e.g., rambler, cottage, mansion), home composition (e.g., building materials, siding type, roof type), solar energy compatibility, yard type, and so forth. In some embodiments, attributes may refer specifically to publicly accessible information, such as information that may be obtained from census records. In some embodiments, attributes may include private databases, such as commercial databases based on commercial or other records. In some embodiments, attributes may include any combination of attributes discussed herein.

As used herein, sales data, sales information, conversion data, transaction data may refer to information about records of past and/or current sales and transactions. The records may include any type of data, including the type of goods or services sold. The goods and services sold may be any type of goods and services, such as solar power, home security, lawn care, home appliances, any other type of sales, and combinations thereof. In some embodiments, sales data may include information about the consumer (e.g., the purchaser). For example, in some embodiments, sales data may include household attributes about the consumer. The attributes may be any attribute discussed herein and may include additional information collected about the consumer at the time of the sale. In one or more embodiments, sales data may refer to an absence of a sales record or transaction information, and may include a variety of data associated with a household (or other entity) related to a transaction, a sale, a return, a positive or negative review, or any other information related to an interaction between the household and a provider.

Additional features and advantages of one or more embodiments of the present disclosure are outlined in the description which follows, and in part will be obvious from the description, or may be learned by the practice of such example embodiments.

Referring now to the figures, FIG. 1 is a representation of a prediction system 100, according to at least one embodiment of the present disclosure. While performing sales, or in preparation to perform a sales call, a sales representative may utilize a client device 102. The client device 102 may include a graphical user interface 104 (GUI 104). The sales representative may use the client device 102 to review sales information, review a map of potential sales, and perform many other activities. The client device 102 may be a mobile device, such as a cellular phone, a tablet, a laptop computer, and so forth. Sales representatives often work offline (e.g., in the "field") or away from an office environment with reliable access to Wi-Fi or other high-speed internet. Furthermore, as discussed herein, the mobile device 102 may have limited processing capacity.

In accordance with embodiments of the present disclosure, the sales representative may identify, on the GUI 104, a target geographic zone. For example, a user of the client device 102 may identify a target neighborhood in which he or she would like to perform sales or otherwise engage with potential customers. The neighborhood may be a target geographic zone having a geographic zone identifier 106. The client device 102 may transmit the geographic zone identifier 106 to a remote server, such cloud network 108.

The client device 102 may further transmit, with the geographic zone identifier 106, a request for a prediction score associated with the target geographic zone.

When the cloud network 108 receives the geographic zone identifier 106 and associated request, the cloud network 108 may transmit a pre-determined average (or otherwise combined) prediction score 110 for the target geographic zone. The client device 102 may present the average prediction score 110 on the GUI 104, and the sales representative may make sales decisions based on the presented average prediction score. In this manner, the client device 102 may not calculate the average prediction score 110, determine the average prediction score 110, or otherwise perform any other action with respect to the average prediction score 110 other than request it, receive it, and display it. As discussed herein, this may reduce the processing load on the client device 102 and decrease the time between requesting the average prediction score 110 and displaying the average prediction score 110. This may further reduce the bandwidth and data usage of the client device 102 when requesting and receiving the average prediction score 110. This may also help to reduce the battery drain on the client device 102, when requesting and retrieving the average prediction score 110.

In accordance with embodiments of the present disclosure, the cloud network 108 may receive one or more prediction scores from a prediction score generator 112. The prediction score generator 112 may generate prediction scores 114 for individual households based on associations between sales data and household attributes. For example, a company may have sales records for past sales of a particular product or product category. The prediction score generator 112 may analyze the sales records and identify correlations between the sales records and household attributes for the household that purchased the product. Using the identified correlations, the prediction score generator 112 may analyze the household attributes of different households (e.g., households that the company has not previously contacted and/or sold products to) and provide a prediction score 114 of how likely a particular household may be to purchasing a product. The prediction score generator 112 may provide these prediction scores 114 to the cloud network 108.

In some embodiments, the prediction score generator 112 may generate a prediction score 114 for each household in a geographic zone. In some embodiments, the prediction score generator 112 may generate a prediction score 114 for each household for which it has data. In some embodiments, the prediction score generator 112 may generate a prediction score 114 for every single household in a hierarchical geographical model. As used herein the average prediction score may refer to any composite prediction based on multiple individual predictions. This may refer to an average, median, or any normalized value based on the multiple individual scores. In one or more embodiments, the prediction score(s) may include an indication of confidence associated therewith.

The cloud network 108 may include a prediction score compiler 116. When the cloud network 108 receives the prediction scores 114 from the prediction score generator 112, the score compiler 116 may store the prediction scores 114 in a prediction score database 118. In some embodiments, the score compiler 116 may generate one or more average prediction scores 110 for each geographic zone in the hierarchical geographical model. The average prediction score 110 for each geographic zone may then be stored in the score database 118.

In accordance with embodiments of the present disclosure, the score compiler 116 may calculate each average prediction score 110 separately. For example, the score compiler 116 may separately and independently calculate the average prediction score 110 for each geographic zone in a lower tier of the hierarchical geographical model using the prediction score 114 for each household located within the boundaries of the geographic zone. For a higher tier in the hierarchical geographical model, the score compiler 116 may calculate the average prediction score 110 using each household located within the boundaries of the geographic zone in the higher tier, rather than averaging the average prediction scores 110 of the geographic zones in the lower tier. This may help to improve the accuracy and/or representativeness of the average prediction score 110 for higher tiers. For example, not every single geographic zone in a lower tier may have the same number of households. By independently calculating the average prediction score 110 for the higher tiers from the individual household prediction scores 114, the score compiler may account for every household equally.

In some embodiments, each geographic zone may include or be associated with a location index. In some embodiments, the location index may include location data or references to location data, such as boundary points. In some embodiments, the location index may be used as an identifier for a particular geographic zone, and the score database 118 may include a matching identifier. In some embodiments, the score database may include the location data for the geographic zones. The score compiler 116 may use the location index to determine which prediction scores 114 to include in the average prediction score 110. In some embodiments, an application on the client device 102 may include location indexes for the geographic zones. When the user desires to review the average prediction score 110 of a particular geographic zone, the application on the client device 102 may transmit a request to the score compiler 116 with the location index. The cloud server 108 may then use the location index to retrieve the appropriate average prediction score 110 from the score database 118. Put another way, when the cloud server 108 receives the request and the location index from the client device 102, the cloud server 108 may search for the average prediction score 110 in the score database 118 using the location index.

Figure 2:
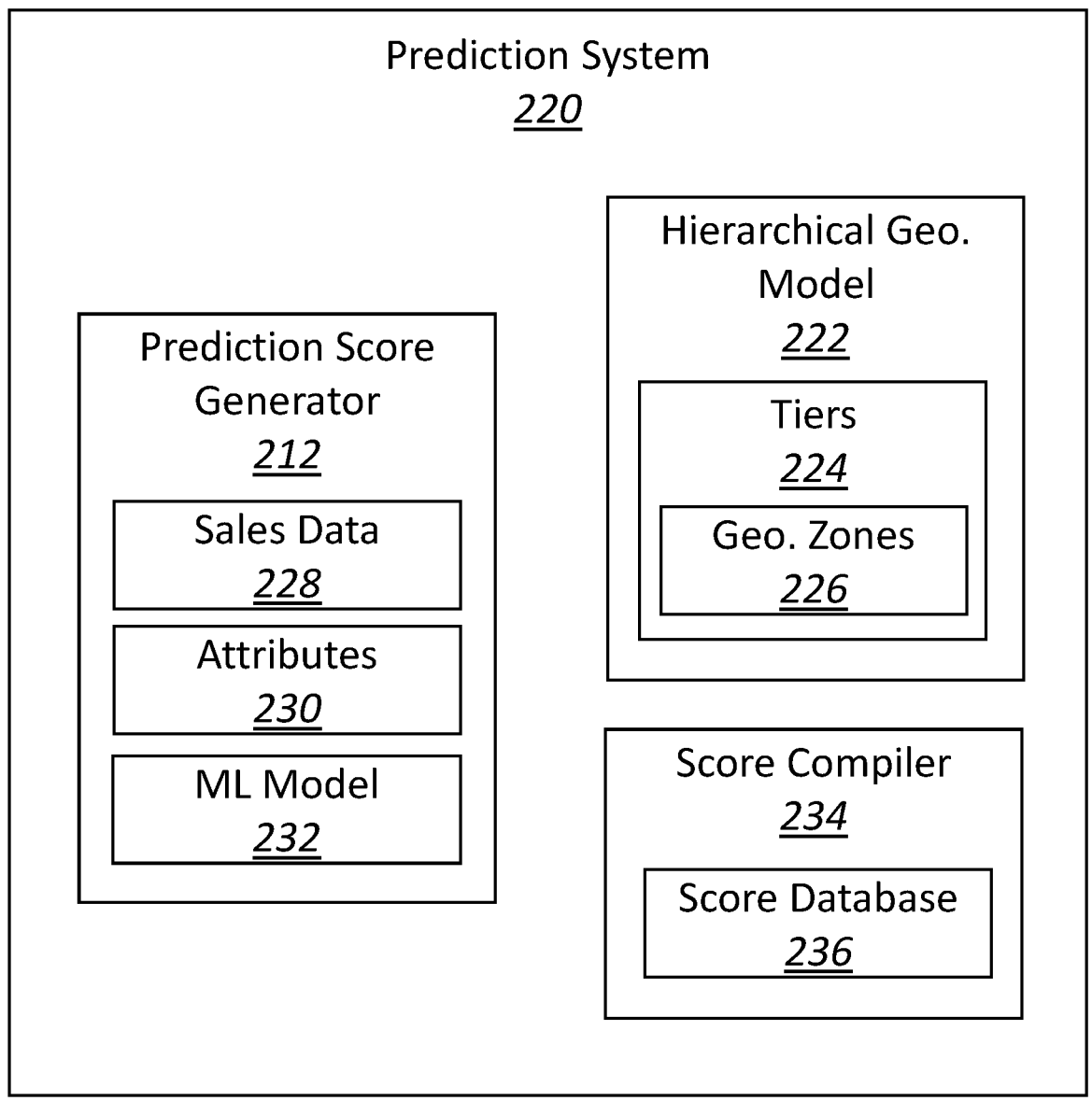
FIG. 2 is a block diagram showing an example implementation of a prediction system in accordance with one or more embodiments.

FIG. 2 is a block diagram illustrating an example representation of a prediction system 220, according to at least one embodiment of the present disclosure. Each of the components of the prediction system 220 can include software, hardware, or both. For example, the components can include one or more instructions stored on a computer-readable storage medium and executable by processors of one or more computing devices, such as a client device or server device. When executed by the one or more processors, the computer-executable instructions of the prediction system 220 can cause the computing device(s) to perform the methods described herein. Alternatively, the components can include hardware, such as a special-purpose processing device to perform a certain function or group of functions. Alternatively, the components of the prediction system 220 can include a combination of computer-executable instructions and hardware.

Furthermore, the components of the prediction system 220 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The prediction system 220 includes a hierarchical geographical model 222. The hierarchical geographical model 222 includes a plurality of tiers 224, each of which includes one or more geographic zones 226. Each of the geographic zones 226 in the hierarchical geographical model 222 includes and/or are associated with a location index. The location index may allow the prediction system 220 to quickly and efficiently identify the geographic zones 226.

The prediction system 220 includes a prediction score generator 212. The prediction score generator 212 may generate or determine prediction scores. As discussed herein, the prediction score generator 212 may generate the prediction scores by correlating sales data 228 with one or more household attributes 230. The sales data 228 may include sales records for previous sales by the company, including attributes 230 associated with the sale. Using the attributes 230 for the purchasing households in the sales data 228, the prediction score generator 212 may identify correlations between the attributes 230 and the sales data 228. In some embodiments, the sales data 228 may include any type of sales, such as solar power, home security, lawn care, home appliances, any other type of sales, and combinations thereof.

In some embodiments, a company may generate prediction scores for a single set or category of sales data 228. In some embodiments, a company may generate prediction scores for multiple sets or categories of sales data 228. For example, a company may sell multiple products or services, and the company may generate a prediction score for each product and service offered. In this manner, the company may tailor the prediction scores to a particular product or service, thereby increasing the effectiveness of their sales teams or sales representatives.

As will be discussed in further detail herein, the prediction score generator 212 may include a machine learning (ML) model 232. The household attributes 230 and the sales data 228 may be input into the ML model 232, and the ML model 232 may be trained to identify the correlations between the sales data 228 and the household attributes 230. Using the identified correlations, when the household attributes for a particular household are input into the ML model 232, the ML model 232 may output the prediction score.

The prediction score generator 212 may provide the prediction scores to a score compiler 234. The score compiler 234 may store the prediction scores in a prediction score database 236. In some embodiments, the score compiler 234 may store the individual prediction scores for each individual household in the score database. In some embodiments, using the geographic zones 226 in the hierarchical geographical model 222, the score compiler 234 may generate average prediction scores (or other combined prediction scores) for each geographic zone 226 and store the average prediction scores in the score database 236. The average prediction scores may be stored in the score database 236 based on the location identifier for the geographic zones 226.

As discussed herein, the score compiler 234 may calculate average prediction scores for the geographic zones 226 based on the individual households that reside within the geographic zone 226. In some embodiments, the average prediction scores for geographic zones 226 in different tiers 224 may be calculated separately or independently.

Figures 1, 3:
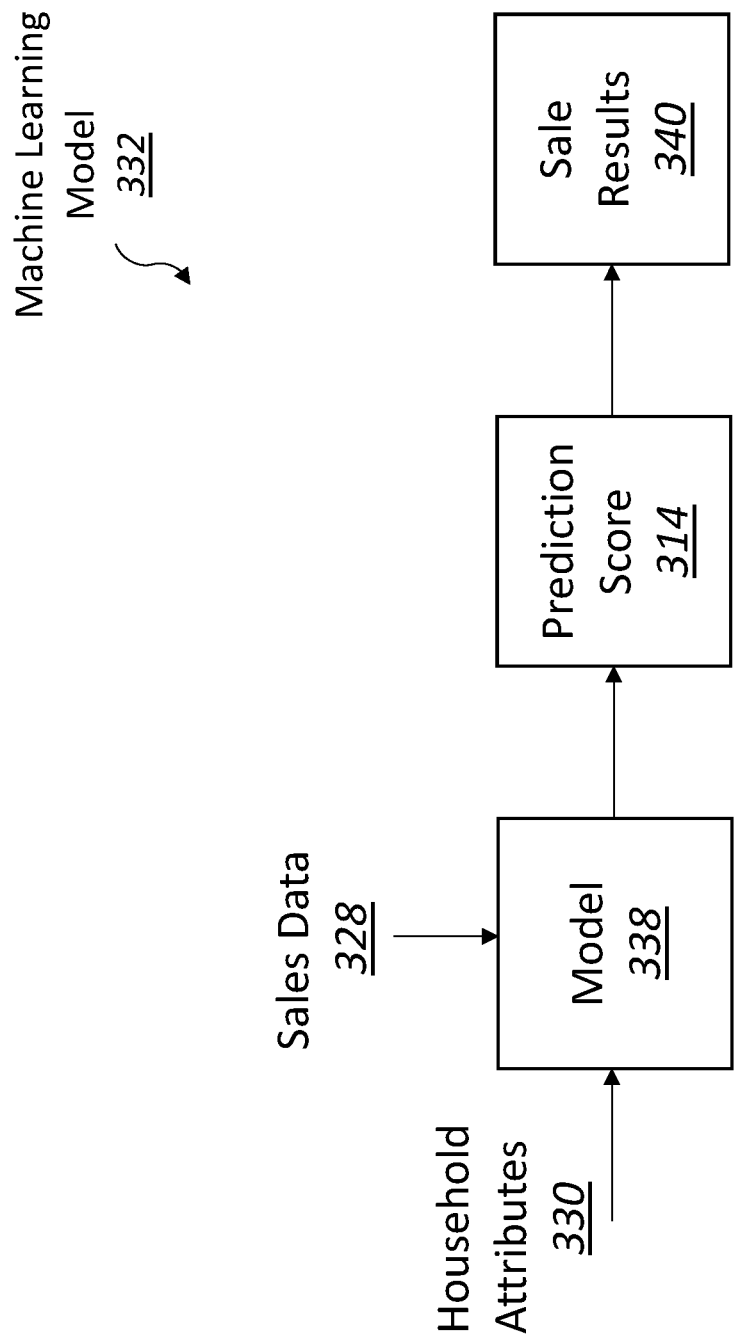
Figures 2, 3:
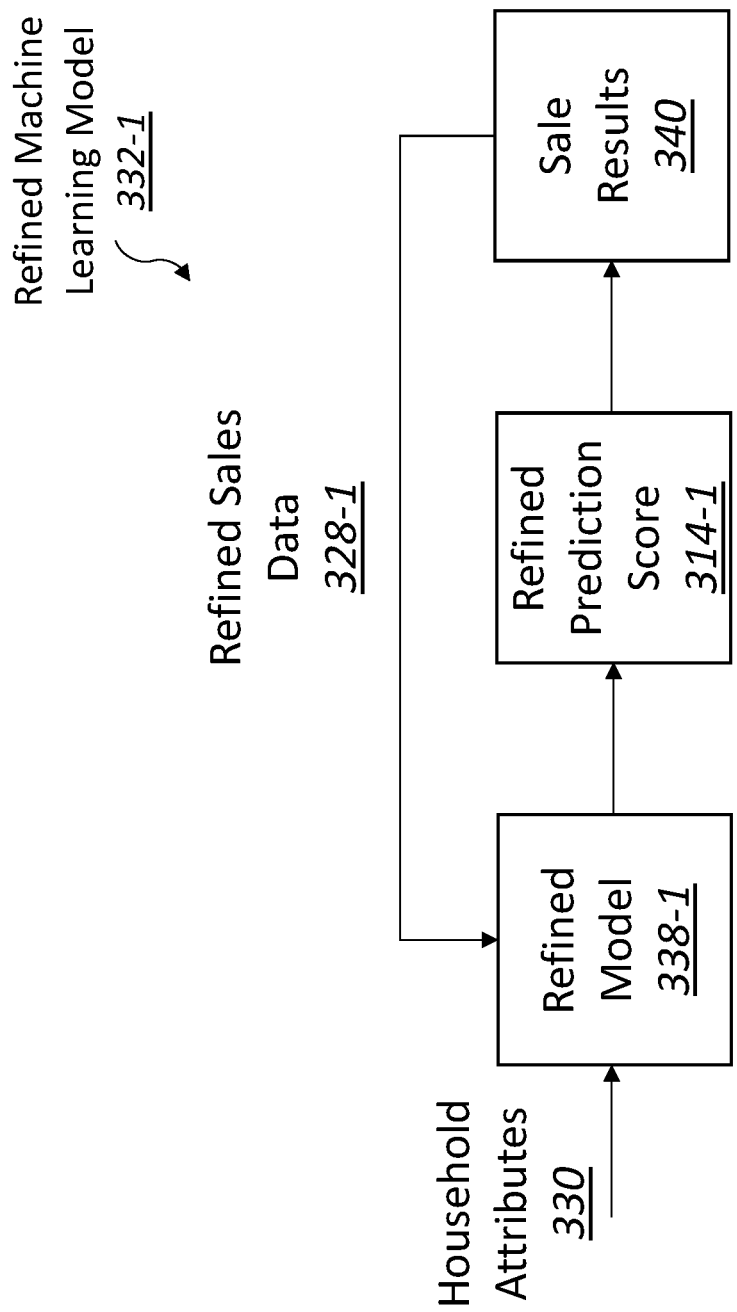

FIG. 3-1 is a representation of an ML model 332 that outputs a prediction score 314, in accordance with at least one embodiment of the present disclosure. The ML model 332 includes a model 338 which is trained using sales data 328. The model 338 may identify correlations in the sales data 328 between a particular product, good, or service sold and the associated attributes of the consumer who purchased it. The model 338 may assign a weight to certain attributes as being associated with the purchase of the product, good, or service.

The trained model 338 may then receive an input of household attributes 330. In some embodiments, the household attributes 330 may be from households that have not completed a purchase of the particular product, good, or service. Using the identified correlations from the sales data 328, the model 338 may analyze the household attributes 330 and output a prediction score 314 for a given household.

A sales representative (or other user of a client device) may then determine a chance of success of a sale based on the prediction score 314. If the sales representative contacts a particular household having a prediction score 314, the sales representative may identify one or more sale results 340 from the customer contact. The sale results 340 may be binary, such as successful or unsuccessful sale. In some embodiments, the sale results 340 may include information such as product sold, quantity sold, money spent, customer interest, and so forth.

After the customer contact and attempted sale, the ML model 332 may be fine-tuned to create a refined ML model 332-1, as may be seen in FIG. 3-2. The refined ML model 332-1 may receive (e.g., as feedback) the refined sales data 328-1, including the sale results 340 from the customer contact. In some embodiments, the refined sales data 328-1 may include positive sales information, such as completed sales. In some embodiments, the refined sales data 328-1 may include negative sales information, such as an unsuccessful sale with a particular potential customer. Using the refined sales data 328-1, the model 338 may be refined to a refined model 338-1. The refined model 338-1 may then receive household attributes 330 for a household and generate a refined prediction score 314-1.

It is important to note that the household attributes 330 are input into the refined model 338-1 for a household for which an attempted sale has not been made. This is because, if the household has been contacted, then there is no need for a prediction score 314, because there are no sales results 340 to predict; the sales results 340 have already been observed. However, households for which a prediction score 314 has previously been generated, but which the company has not contacted or attempted a sale to, may receive a refined prediction score 314-1 by the refined model 338-1.

In some embodiments, the company may periodically refine their ML model 332. For example, a company may refine the model 338 with refined sales data 328-1 based on a duration that has passed since the last update, such as every day, every week, every month, every two months, every six months, every year, every decade, or any value therebetween. In some embodiments, the company may refine the model 338 with refined sales data based on a number of sales, sale results 340, or household contacts, such as every sale, every five sales, every 10 sales, every 50 sales, every 100 sales, every 500 sales, every 1,000 sales, every 5,000 sales, every 10,000 sales, every 50,000 sales, every 100,000 sales, or any value therebetween. Regularly or periodically refining the model 338 may help to regularly provide refined prediction scores 314-1, thereby allowing the company to focus its sales efforts more effectively.

Figure 4:
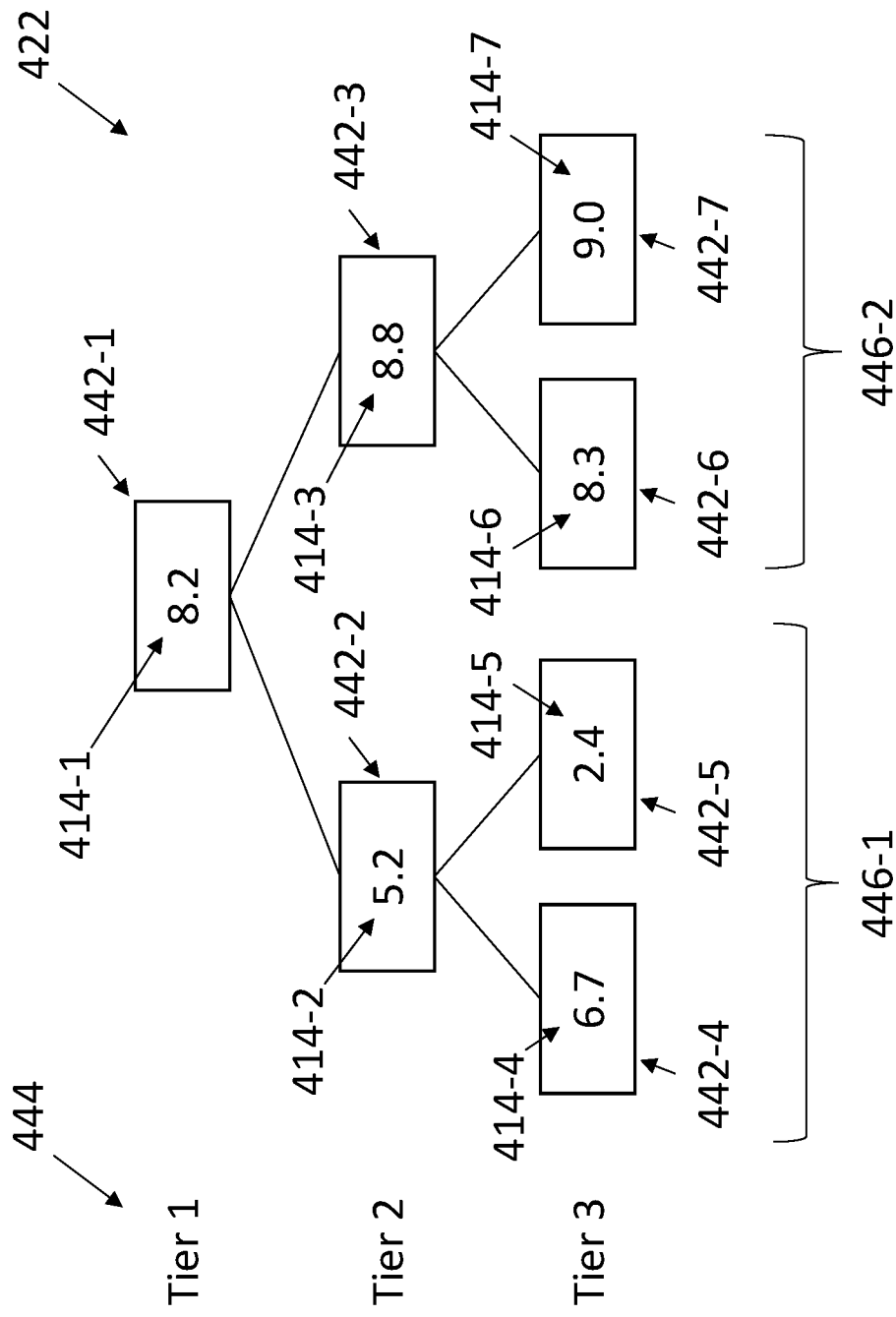
FIG. 4 illustrates a hierarchical geographical model in accordance with one or more embodiments.

FIG. 4 illustrates an example implementation of a hierarchical geographical model 422 according to at least one embodiment of the present disclosure. The hierarchical geographical model 422 includes a plurality of nodes (collectively 442) organized into two or more tiers 444. The nodes 442 may be representative of geographic zones (e.g., geographic zones 226 of FIG. 2) including a boundary that encompasses an area on a map. For the purposes of this disclosure, the terms node 442 and geographic zone may be used interchangeably.

In the example shown, the hierarchical geographical model 422 includes three tiers 444. The hierarchical geographical model 442, however, may include more or fewer than three tiers 444. For example, the hierarchical geographical model 442 may include any of 2, 3, 4, 5, 6, 7, 8, 9, 10, 15, 20, 30, 40, 50, or more tiers 444. A tier 444 may be higher or lower than other tiers in the hierarchy of the hierarchical geographical model 422. A higher tier 444 may include nodes 442 having larger geographic areas than lower tiers 444. In the embodiment shown, Tier 1 is a higher tier 444 than Tier 2 and Tier 3, and Tier 3 is a lower tier 444 than Tier 2 and Tier 1. Tier 2 is higher than Tier 3 and lower than Tier 1.

Each tier 444 includes at least one node 442. For example, Tier 1 includes a first node 442-1, Tier 2 includes a second node 442-2 and a third node 442-3, and Tier 3 includes a fourth node 442-4, a fifth node 442-5, a sixth node 442-6, and a seventh node 442-7. A group of nodes 442 within a tier 444 may be a subset of all the nodes 442 of the hierarchical geographical model 422. For example, Tier 1 has a first subset of nodes 442 that includes the first node 442-1, Tier 2 has a second subset of nodes 442 that includes the second node 442-2 and the third node 442-3, and Tier 3 has a third subset of nodes 442 that includes the fourth node 442-4, the fifth node 442-5, the sixth node 442-6, and the seventh node 442-7.

The hierarchical geographical model 422 may include one or more branches (collectively 446). Branches 446 may be portions the hierarchical geographical model 422 that share common boundaries, geographic areas, or geographic zones. In some embodiments, the area of a particular node 442 may be comprised of the area of the nodes 442 that are in a lower tier 444 along the same branch 446. In some embodiments, the entire area of a particular node 442 may be defined by the area of the lower-tier 444 nodes 442 in the same branch 446. In some embodiments, the boundaries of the node 442 may be defined by the outermost boundaries of the lower-tier 444 nodes 442 in the same branch 446.

For example, in the embodiment shown, the first branch 446-1 includes the fourth node 442-4 and the fifth node 442-5. The fourth node 442-4 and the fifth node 442-5 are lower-tier nodes than the second node 442-2 along the first branch 446-1. The boundary of the second node 442-2 may fully encompass the boundaries of both the fourth node 442-4 and the fifth node 442-5, and/or be defined by the boundaries of the fourth node 442-4 and the fifth node 442-5. Similarly, a second branch 446-2 includes the sixth node 442-6 and the seventh node 442-7, which are lower-tier nodes 442 to the third node 442-3. The third node 442-3 may encompass and/or be defined by the boundaries of the sixth node 442-6 and the seventh node 442-7. In FIG. 4, the entire hierarchical geographical model 422 includes a single branch 446 stemming form the first node 442-1. The second node 442-2, the third node 442-3, the fourth node 442-4, the fifth node 442-5, the sixth node 442-6, and the seventh node 442-7 are lower-tier nodes 442 to the first node 442-1. The first node 442-1 fully encompasses and/or is defined by the collective boundaries of the second node 442-2 and the third node 442-3. Furthermore, the first node 442-1 fully encompasses and/or is defined by the collective boundaries of the fourth node 442-4, the fifth node 442-5, the sixth node 442-6, and the seventh node 442-7.

Each of the nodes 442 includes an associated prediction score 414 (collectively 414). The prediction score 414 may be calculated based on the households within each node 442. Thus, the prediction score 414 may not be an average of the lower-tier nodes' prediction scores 414. For example, the first prediction score 414-1 of the first node 442-1 may not be simple average of the second prediction score 414-2 and the third prediction score 414-3. And the second prediction score 414-2 may not be a simple average of the fourth prediction score 414-4 and the fifth prediction score 414-5. And the third prediction score 414-3 may not be a simple average of the sixth prediction score 414-6 and the seventh prediction score 414-7. This may be because of different numbers of households in the various nodes 442, different attribute weights in different nodes 442, or for any other reason. By independently calculating the prediction score 414 for each node 442, a sales representative may receive prediction scores that are more representative of the population of the node 442.

As will be discussed in further detail herein, each of the nodes 442 may be referenced using an index or vector value with each of the respective tiers 444 being associated with a value within the index. For instance, in the example shown in FIG. 4, an index may have three values with each value indicating a node within a corresponding tier of the hierarchical model 422. As an example, a first node 442-1 may be referenced using an index value of "1-0-0" indicating a first node of the first tier with zero values excluding lower tiers of the model 422. Similarly, a second node 442-2 may be referenced using an index value of "1-1-0" using a similar convention. A third node 442-3 may be referenced using an index value of "1-2-0." The nodes of the third tier may be referenced using an index value of "1-1-1," "1-1-2," "1-2-3," and "1-2-4" or any other naming convention. As will be discussed in further detail below, these index values (e.g., one or multiple, depending on the zones that are displayable within a GUI) may be included as part of a request for prediction scores for a particular geographic zone. These index values may be used to quickly and efficiently retrieve and display pre-calculated prediction scores associated with corresponding zones.

Figures 1, 5:
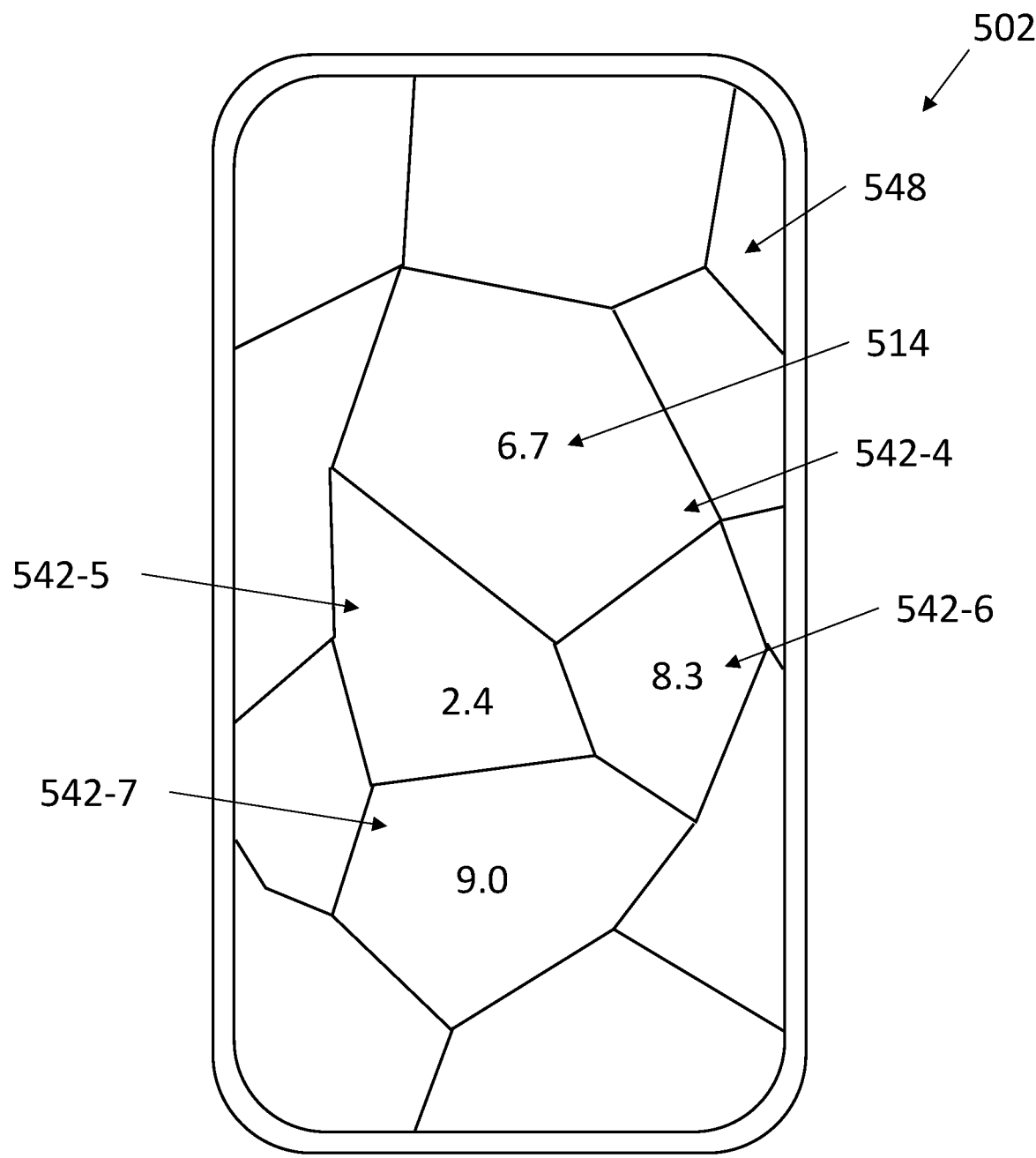
Figures 2, 5:
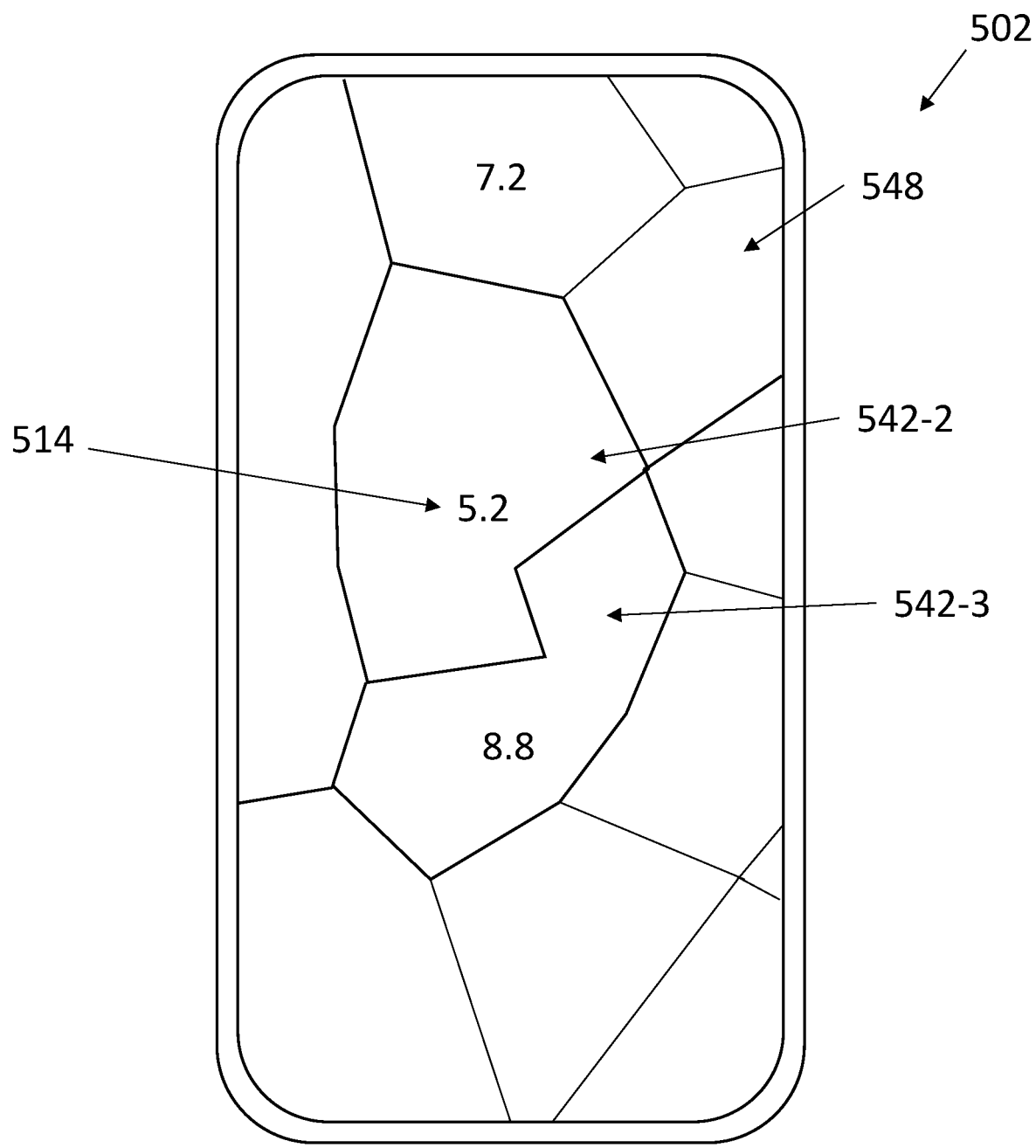
Figures 3, 5:
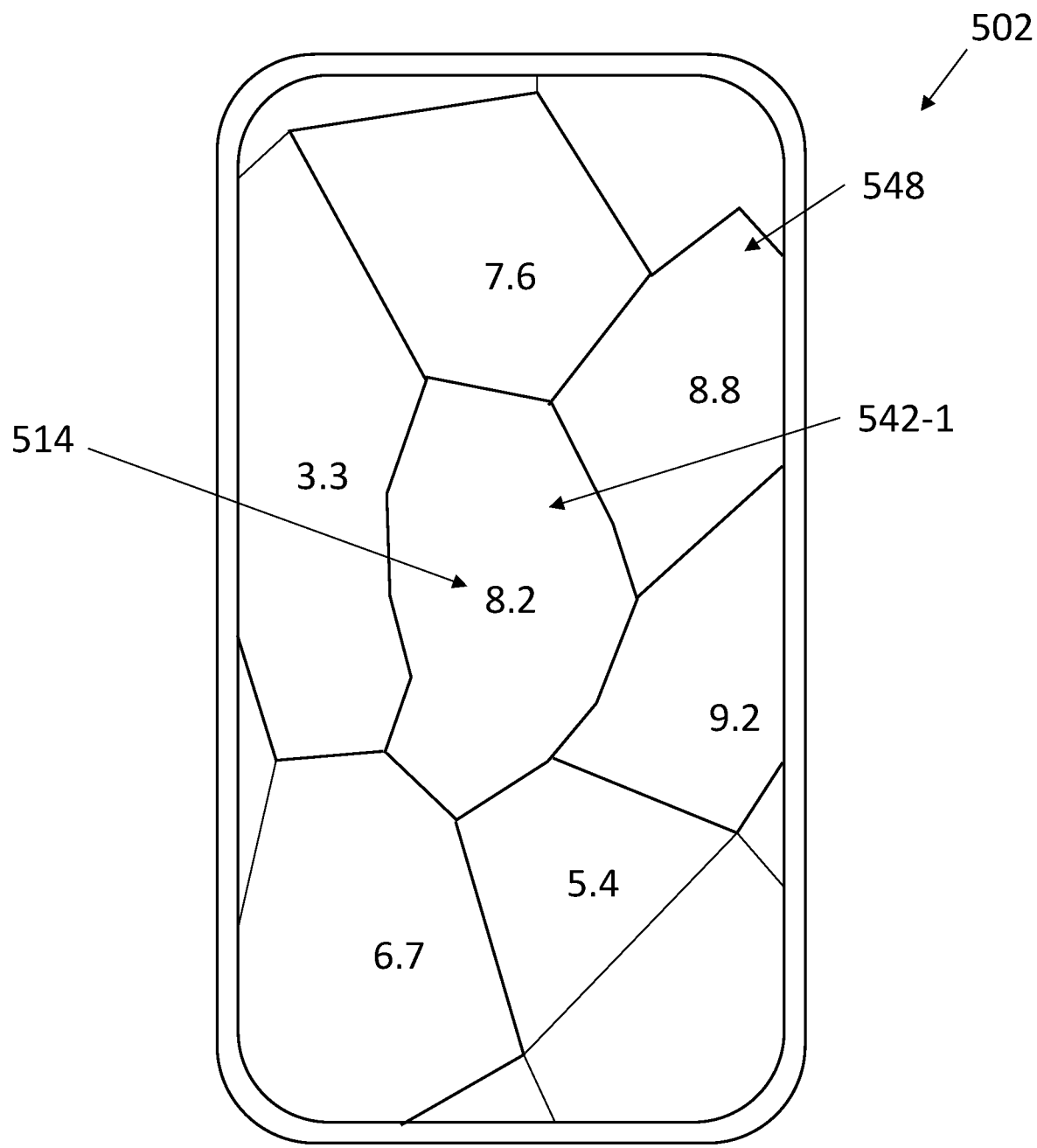

FIG. 5-1 through FIG. 5-3 are example representations of a graphical user interface (GUI) 548 on a client device 502. Displayed on the GUI 548 may be a prediction map. The prediction map may be separated into different nodes (collectively 542) representative of geographic zones. A prediction score 514 for the nodes 542 may be displayed on the prediction map.

The nodes 542 that are displayed may be selected based on the area of the prediction map that is displayed in the GUI 548. Put another way, the boundaries of the prediction map that are displayed in the GUI 548 may determine which nodes 542 are displayed and which prediction scores 514 are displayed. In some embodiments, the displayed boundaries of the prediction map may determine which tier (e.g., tier 444 of FIG. 4) of nodes 542 may be displayed on the GUI 548. For example, in the embodiment shown, the prediction map is zoomed in far enough that the fourth node 542-4, the fifth node 542-5, the sixth node 542-6, and the seventh node 542-7 may be displayed with sufficient resolution to allow each node 542 to have its own prediction score displayed 514. By zooming in (e.g., by reducing the area of the prediction map displayed in the GUI 548), nodes 542 having a smaller area may be displayed with their associated prediction score 514.

As may be seen in FIG. 5-2, by zooming out (e.g., by increasing the area of the prediction map displayed in the GUI 548), the resolution of the prediction map may be decreased. In FIG. 5-2, the area of the prediction map has been increased until the fourth node 542-4 and the fifth node 542-5 have been collapsed into the second node 542-2, and the sixth node 542-6 and the seventh node 542-6 have been collapsed into the third node 542-3. The prediction score 514 for the second node 542-2 and the third prediction node 542-3 may be displayed on the GUI 548. In this manner, the sales representative may gain a higher-level view of the prediction scores. As may be seen, when zooming out and increasing the displayed area of the prediction map, additional nodes 542 may be displayed on the prediction map.

In FIG. 5-3, the prediction map has been further zoomed out until the second node 542-2 and the third node 542-3 have been collapsed into the first node 542-1, and the associated prediction score 514 displayed. Furthermore, additional nodes 542 and their associated prediction scores 514 have been display. In this manner, the user may manipulate the prediction map to select which tier of nodes 542 is display. This may allow the user to customize which nodes 542 are display and with what resolution, thereby allowing the user greater flexibility in sales planning and analysis.

While FIG. 5-1 through FIG. 5-3 illustrate features and functionalities related to zooming the prediction map out (e.g., increasing the displayed area of the prediction map), it should be understood that the resolution of the prediction map may be changed by zooming the prediction map in (e.g., decreasing the displayed area of the prediction map). When the user manipulates the prediction map to decrease the displayed area, the first node 542-1 may be broken up to display the second node 542-2 and the third node 542-3, as shown in FIG. 5-2. The user may further decrease the displayed area to display the fourth node 542-4, the fifth node 542-5, the sixth node 542-6, and the seventh node 542-7. In some embodiments, the user may change the displayed area by adjusting the center of the displayed prediction map on the GUI 548. This may cause adjacent or other nodes 542 to be displayed on the GUI.

In some embodiments, the client device 502 may automatically determine the tier of nodes 542 to be displayed, based on the scale of the displayed prediction map. For example, a particular scale or scale range of the displayed prediction map may be associated with a particular tier of nodes 542. When the user adjusts the zoom to within the scale range, the client device may automatically adjust the tier of the displayed nodes 542.

In some embodiments, the displayed nodes 542 may be overlaid over a conventional map. For example, the displayed nodes 542 may be overlaid on a satellite map, a street map, a hybrid map, or any other map. This may allow the user to view the nodes and associated prediction scores with one or more reference points from the maps. In some embodiments, based on the tier determined by the zoom level, the client device 502 may display the boundaries of the nodes 542, including the nodes 542 that are not fully visible in the GUI 548. In some embodiments, the prediction score 514 may be displayed on a node 542 that has a minimum percentage of its area display, such as 25%, 50%, 75%, 100%, or any pre-determined value therebetween. In some embodiments, the prediction score 514 may be displayed at the center of the node 542, and may only be visible in the GUI 548 if the center of the node 542 is visible.

In some embodiments, as the user changes the displayed area on the GUI 548, the client device 502 may identify the various nodes 542 visible to the user. The client device 502 may then transmit a node identifier or a geographic zone identifier associated with the displayed node 542 to the prediction system. The client device 502 may further transmit a request for the prediction score associated with the node 542 or geographic zone. As discussed herein, upon receiving the request, including the identifier (e.g., the index value(s)), the prediction system may retrieve the prediction score from the score database and transmit it to the client device 502. By only transmitting the identifier and request for the prediction score, and only receiving the prediction score, the amount of data transmitted between the client device 502 and the prediction system may be reduced. Furthermore, because the prediction score has been predetermined or pre-calculated, the processing load for the client device 502 to display the prediction score may be reduced.

In some embodiments, the prediction scores 514 that are displayed on the nodes 542 may be associated with a color code. The color code may be broadly representative of the favorability of a potential sales outcome. For example, prediction scores of between 7.0 and 10.0 may be displayed in green, prediction scores of between 3 and 6.9 may be displayed in orange, and prediction scores of less than 2.9 may be displayed in red. In some embodiments, the borders and/or the area of the node 542 may be displayed in the associated color. This may allow the user to visually determine the general range of prediction scores 514 for the node 542.

In some embodiments, a company may set one or more permissions for a particular user to access particular nodes 542 or prediction scores 514. For example, a company may set a permission for a user to access nodes 542 and prediction scores 514 from a specific tier of the hierarchical geographical model. In some examples, a user may have permission to access nodes 542 within a specific branch of the hierarchical geographical model (e.g., nodes associated with a specific geographical region or area). For instance, in one or more embodiments, a user may have permission to access a combined prediction score for a particular neighborhood or a sub-division, but not for individual houses. In some examples, a user may have selective access to prediction scores for one or more products or services. This may allow the company to restrict information to ensure consumer privacy, enforce sales representative territories, disincentivize representatives from skipping large portions of houses, and so forth.

Figure 6:
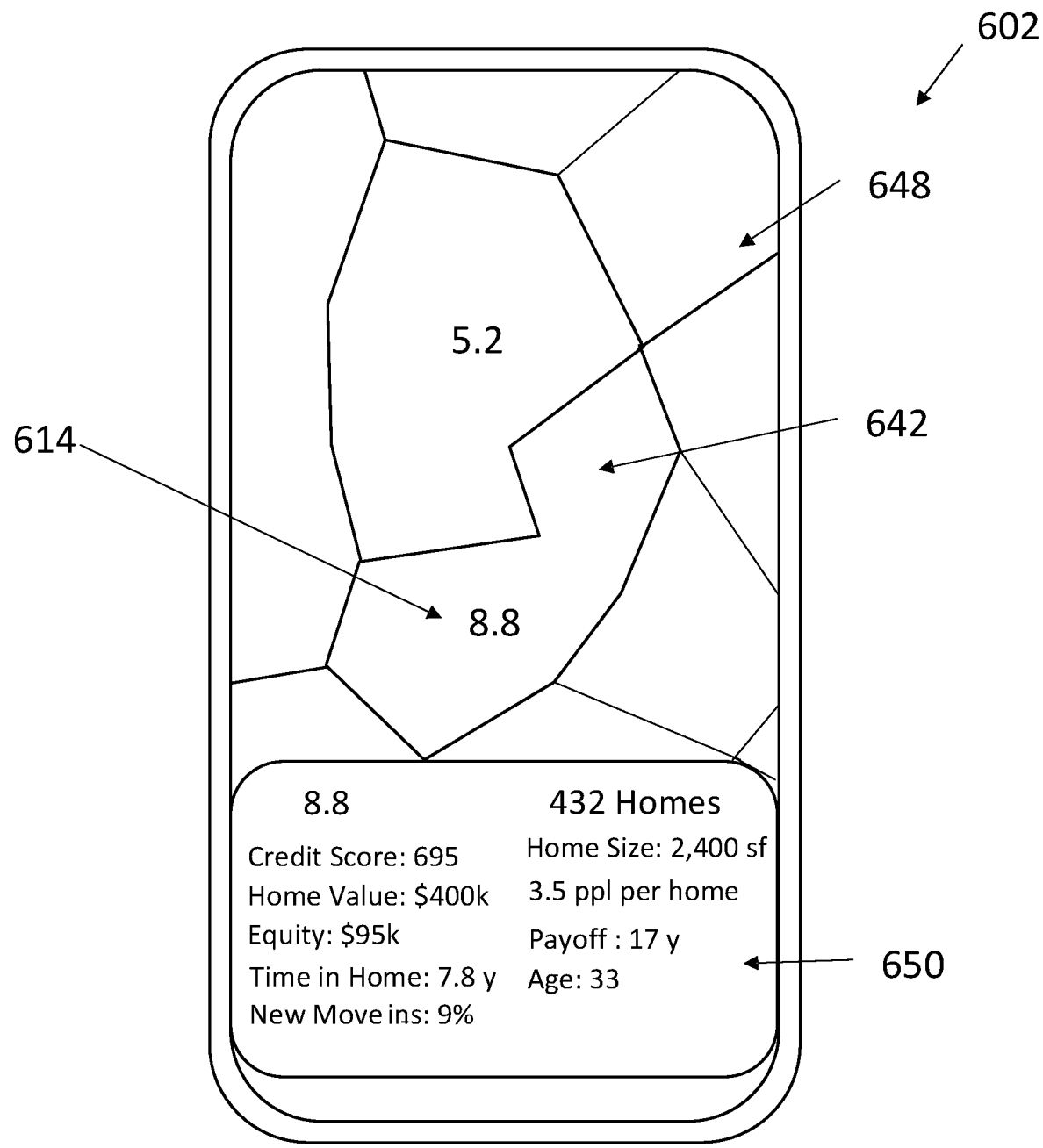
FIG. 6 illustrates a prediction map and an information screen presented on a graphical user interface in accordance with one or more embodiments.

FIG. 6 is a representation of a client device 602 having the prediction map of FIG. 5-2 displayed on a GUI 648, according to at least one embodiment of the present disclosure. In some embodiments, an information screen 650 may be displayed on the GUI 648. The information screen 650 may include information about a particular node 642. For example, the information screen may include the average prediction score 614, the number of households in the node 642, and one or more average attributes about the households that are located in the node 642. For example, the information screen may include the average credit score, the average home value, the average equity in the home, the average time that residents have lived in their home, the percentage of residents that have moved into their households in the last year, the average home size, the average number of residents per home, the mortgage payoff time, the average resident age, any other attribute, and combinations thereof.

In some embodiments, the user may actively select the node 642, such as by touching an icon on a touch screen interface to populate the information screen. In some embodiments, when the user selects the node 642, the client device 602 may request the attributes on the information screen 650 from the cloud server. In some embodiments, the attributes on the information screen may be stored locally on the client device 602.

Figure 7:
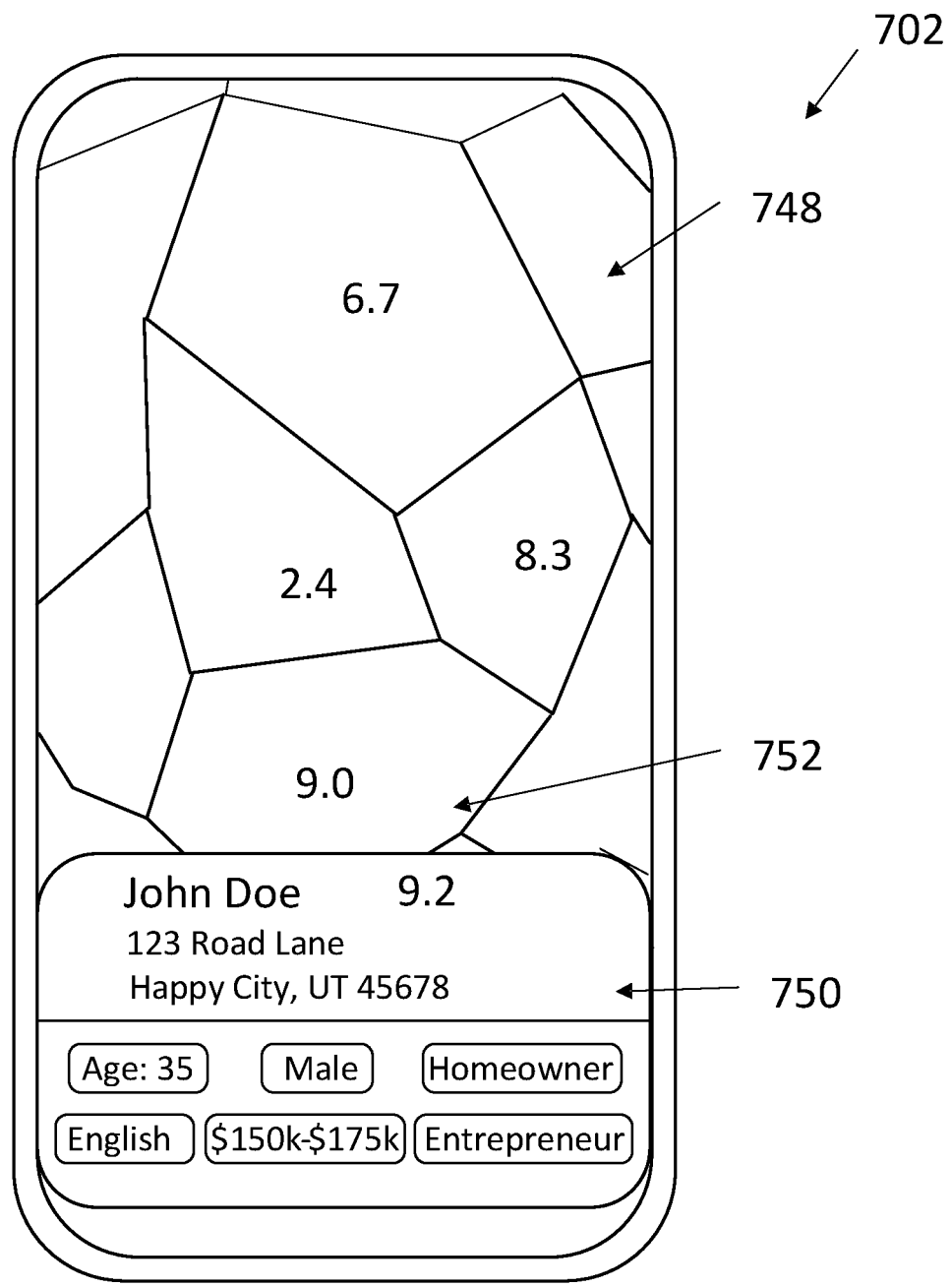
FIG. 7 illustrates a prediction map and an information screen presented on a graphical user interface in accordance with one or more embodiments.

FIG. 7 is a representation of a client device 702 having the prediction map of FIG. 5-3 displayed on a GUI 748, according to at least one embodiment of the present disclosure. In some embodiments, an information screen 750 may be displayed on the GUI 748. The information screen 750 may include information about a particular household 752. For example, the prediction map may be zoomed in to a resolution sufficient to identify individual households 752. The user may select or identify a single household 752 about which to display information on the information screen 750.

The information screen 750 may include information about the household 752, including household attributes. For example, the information screen 750 may include the name or names of individuals living in the household 752, the prediction score for the household, the address of the household, the individual's name, gender, ownership status, language, income level, occupation, any other attribute, and combinations thereof. A sales representative may utilize the information displayed on the information screen 750 for a sales call. This may allow the user to be prepared prior to contacting the household 752.

Figure 8:
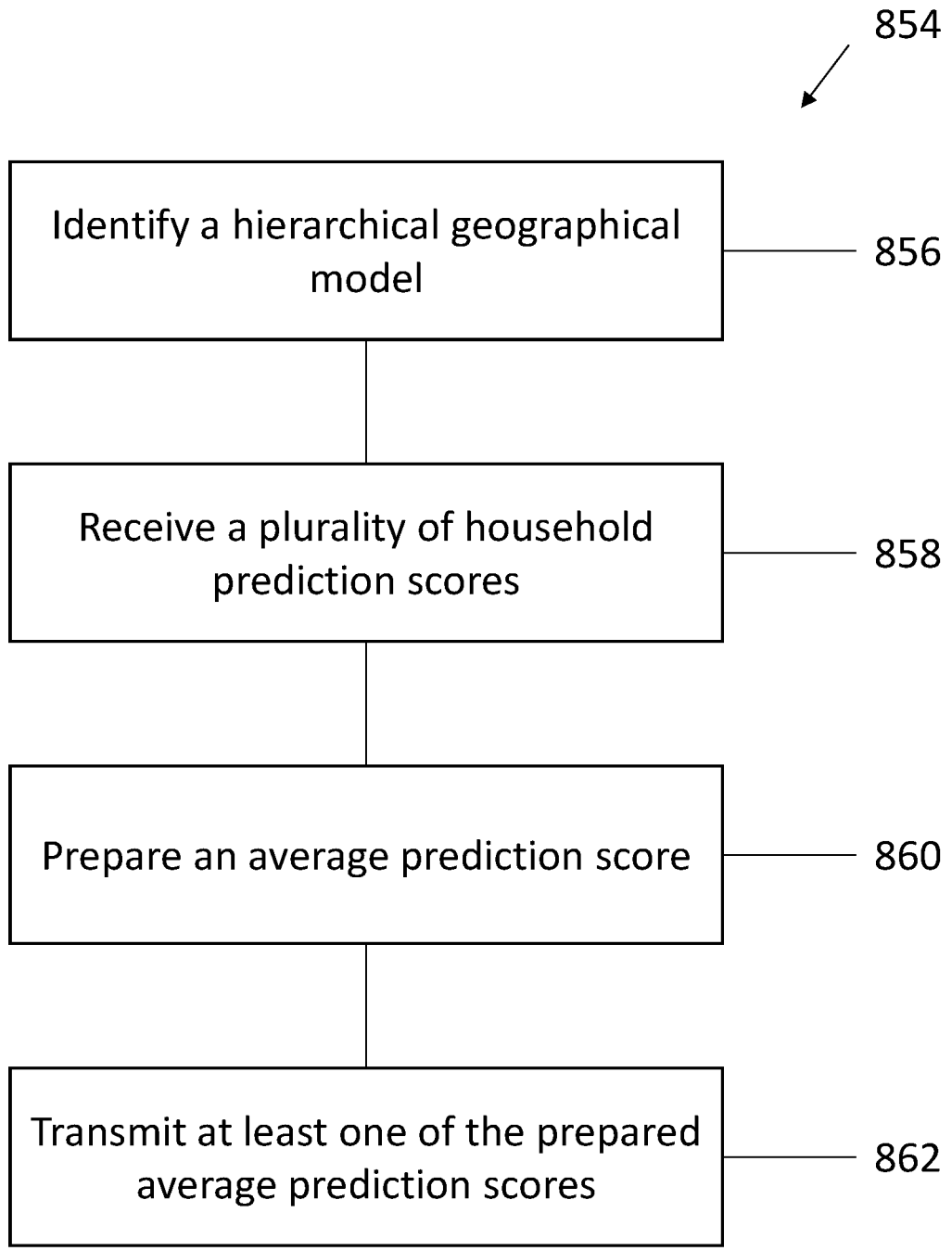
FIG. 8 illustrates a flowchart of a series of acts for predicting performance in accordance with one or more embodiments.
Figure 9:
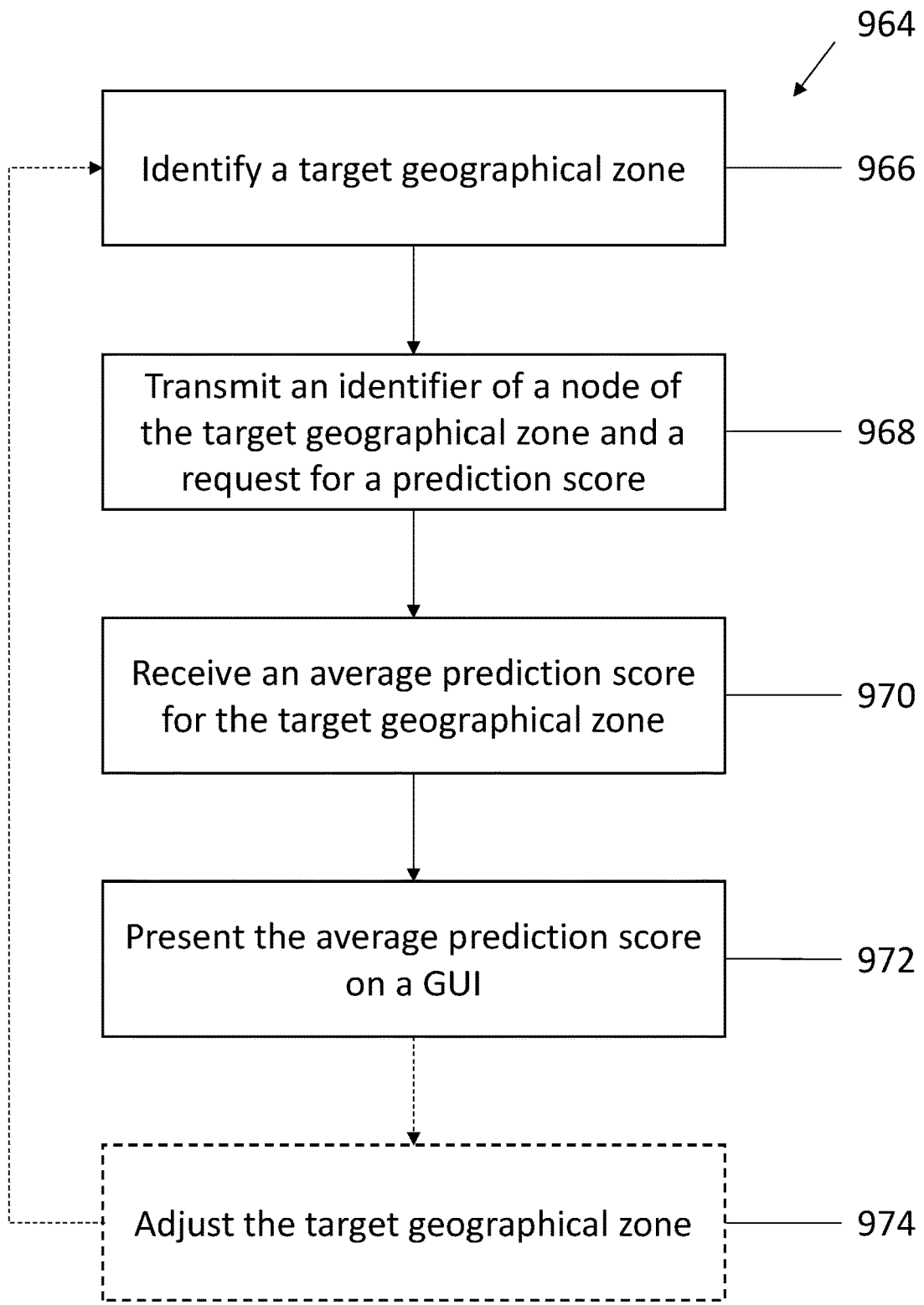
FIG. 9 illustrates a flowchart of a series of acts for predicting performance in accordance with one or more embodiments.

FIG. 8 and FIG. 9, the corresponding text, and the examples provide a number of different methods, systems, devices, and non-transitory computer-readable media of the prediction system 220 of FIG. 2. In addition to the foregoing, one or more embodiments can also be described in terms of flowcharts comprising acts for accomplishing a particular result, as shown in FIG. 8.

FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts for predicting performance, such as sales performance in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

The method 854 includes identifying a hierarchical geographical model at 856. The hierarchical geographical model may include a plurality of geographic zones (e.g., nodes). The hierarchical geographical model includes a first tier and a second tier. The first tier includes a first subset of the plurality of geographic zones and the second tier includes a second subset of the plurality of geographic zones. The prediction model may receive a plurality of household prediction scores for a plurality of households within the hierarchical geographical model at 858. The plurality of household prediction scores may be based on a plurality of attributes.

For each geographic zone of the plurality of geographic zones, the prediction model may prepare an average prediction score based on the household prediction scores of the plurality of households that reside within each geographic zone at 860. Based on a request from a client device, the prediction model may transmit at least one of the prepared average prediction scores to the client device at 862.

In some embodiments, while transmitting the at least one of the prepared average prediction scores, the client device may not calculate the average prediction score. In some embodiments, the method 864 may include preparing the plurality of household prediction scores by inputting the plurality of attributes into a machine learning model. The machine learning model may be trained to output a model prediction score for a given household based on attributes associated with the household. In some embodiments, the plurality of attributes may include publicly accessible data about the households. In some embodiments, the plurality of attributes may include household information, such as name, age, race, gender, phone number, email address, mortgage status, home type, or home composition. In some embodiments, preparing the average prediction score includes preparing a first average prediction score for the first subset separately from a second average prediction score for the second subset.

In some embodiments, the request from the client device may include an index value associated with a node of a target geographic zone of the plurality of geographic zones. In some embodiments, when the prediction system transmits the previously prepared average prediction scores includes transmitting the prepared average prediction scores that are associated with the index value. In some embodiments, each geographic zone of the second subset may be encompassed within a single geographic zone of the first subset.

FIG. 9 is a flowchart of a method 964 for predicting consumer performance, according to at least one embodiment of the present disclosure. The method may include, on a client device, identifying a target geographic zone from a plurality of target geographic zones at 966. In some embodiments, the client device may transmit an identifier or an index value of a node representing the target geographic zone and a request for a prediction score for the target geographic zone to a remote server at 968. Based on the request for the prediction score and the identifier or index value, the client device may receive an average prediction score for the target geographic zone from the remote server at 970. The average prediction score may be based on a pre-calculated average of a plurality of prediction scores for households within the target geographic zone. The client device may then present the average prediction score on a GUI at 972.

In some embodiments, the method 964 may include adjusting the target geographic zone to an adjusted target geographic zone at 974. The adjusted target geographic zone may be an adjustment to the zoom of the prediction map, the position of the prediction map, a selection of a particular geographic zone, any other adjustment, and combinations thereof. In some embodiments, the adjusted target geographic zone may be a modified target geographic zone. In some embodiments, the adjusted target geographic zone may be a selection of an entirely new target geographic zone.

After adjusting the target geographic zone, an adjusted identifier (e.g., a modified identifier, a new identifier) of an adjusted node (e.g., a modified node, a new node) of the adjusted target graphical zone may be transmitted to the remote server. The client device may further transmit an adjusted request (e.g., a modified request, a new request) for an adjusted prediction score for the adjusted target geographic zone to the remote server. Based on the adjusted request, the client device may receive an adjusted average prediction score (e.g., a modified average prediction score, a new average prediction score) for the adjusted target geographic zone from the remote server. In some embodiments, adjusting the target geographic zone may include identifying the adjusted target zone that is in a different tier of a hierarchical geographic zone.

In some embodiments, the target geographic zone may be identified based on a currently displayed region of the GUI. In some embodiments, the pre-calculated average of the plurality of prediction scores is not calculated by the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
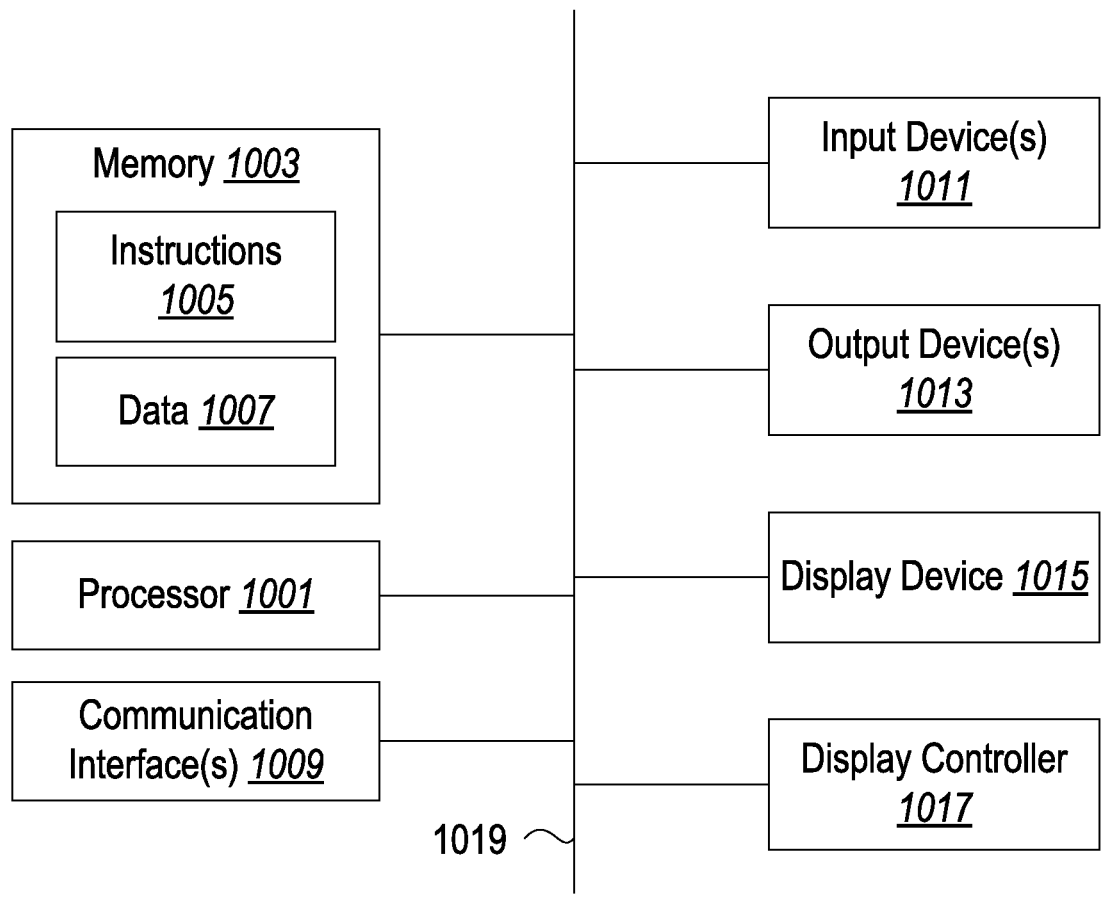
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., prediction system 220, ML model 332, 332-1, cloud network 108, and client devices 102, 502, 602). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method, comprising:
   identifying a hierarchical geographical model including a plurality of geographic zones, wherein the hierarchical geographical model includes a first tier and a second tier, the first tier including a first subset of the plurality of geographic zones and the second tier including a second subset of the plurality of geographic zones wherein the first subset of the plurality of geographic zones have a larger geographic area than the second subset of the plurality of geographic zones;
   receiving a plurality of household prediction scores for a plurality of households based on a plurality of attributes;
   for each geographic zone of the plurality of geographic zones, determining a combined prediction score based on household prediction scores of the plurality of households that reside within the geographic zone;
   based on a request from a client device associated with a geographic zone from the first subset of the plurality of geographic zones, transmitting the prepared combined prediction score for the geographic zone from the first subset of the plurality of geographic zones to the client device;
   receiving the prepared combined prediction score for the geographic zone from the first subset of the plurality of geographic zones;
   generating, by the client device, a prediction map GUI on the client device comprising user-selectable node icons representing geographic zones from the first subset of the plurality of geographic zones;
   detecting, by the client device, a user manipulation of a user-selectable node icon representing a first geographic zone from the first subset of the plurality of geographic zones that decreases a displayed geographic area within the prediction map GUI, wherein the user manipulation of the user-selectable node icon comprises a zoom-in interaction;
   determining one or more geographic zones from the second subset of the plurality of geographic zones that are within a geographic area covered by the first geographic zone from the first subset of the plurality of geographic zones;
   requesting the prepared combined prediction scores for the one or more geographic zones from the second subset of the plurality of geographic zones that are within the geographic area covered by the first geographic zone from the first subset of the plurality of geographic zones; and
   changing a resolution of the prediction map GUI such that the user-selectable node icon representing the first geographic zone from the first subset of the plurality of geographic zones within the prediction map GUI is broken into a plurality of additional user-selectable node icons representing the one or more geographic zones from the second subset of the plurality of geographic zones and the prepared combined prediction scores are overlaid on the plurality of additional user-selectable node icons representing one or more geographic zones from the second subset of the plurality of geographic zones within the prediction map GUI.

2. The method of claim 1, wherein the at least one of the prepared combined prediction scores is transmitted from a server on a cloud computing system to the client device, and wherein the client device does not calculate the combined prediction score.

3. The method of claim 1, further comprising preparing the plurality of household prediction scores by inputting the plurality of attributes into a machine learning model, the machine learning model being trained to output a model prediction score for a given household based on attributes associated with the given household.

4. The method of claim 1, wherein the plurality of attributes include publicly accessible data about the plurality of households.

5. The method of claim 1, wherein the plurality of attributes include personal information, the personal information including name, age, race, gender, phone number, email address, mortgage status, home type, or home composition.

6. The method of claim 1, wherein determining the combined prediction score includes pre-calculating a first combined prediction score for the first subset separately from a second combined prediction score for the second subset.

7. The method of claim 1, wherein the request from the client device includes an index value associated with a node of a target geographic zone of the plurality of geographic zones, and wherein transmitting the at least one of the prepared combined prediction scores includes transmitting the prepared combined prediction scores associated with the index value.

8. The method of claim 1, wherein each geographic zone of the second subset is encompassed within a single geographic zone of the first subset.

9. A system comprising:
a server device comprising:
at least one processor; and
at least one non-transitory computer-readable storage medium storing instructions that, when executed by the at least one processor, cause the server device to:
identify a hierarchical geographical model including a plurality of geographic zones, wherein the hierarchical geographical model includes a first tier and a second tier, the first tier including a first subset of the plurality of geographic zones and the second tier including a second subset of the plurality of geographic zones wherein the first subset of the plurality of geographic zones have a larger geographic area than the second subset of the plurality of geographic zones;
receive a plurality of household prediction scores for a plurality of households based on a plurality of attributes;
for each geographic zone of the plurality of geographic zones, prepare a combined prediction score based on household prediction scores of the plurality of households that reside within the geographic zone; and
based on a request associated with a geographic zone from the first subset of the plurality of geographic zones, transmit the prepared combined prediction score for the geographic zone from the first subset of the plurality of geographic zones; and
a client device comprising:
at least one processor; and
at least one non-transitory computer-readable storage medium storing instructions that, when executed by the at least one processor, cause the server device to:
receive the prepared combined prediction score for the geographic zone from the first subset of the plurality of geographic zones;
generate a prediction map GUI on the client device comprising user-selectable node icons representing geographic zones from the first subset of the plurality of geographic zones;
detect a user manipulation of a user-selectable node icon representing a first geographic zone from the first subset of the plurality of geographic zones that decreases a displayed geographic area within the prediction map GUI, wherein the user manipulation of the user-selectable node icon comprises a zoom-in interaction;
determine one or more geographic zones from the second subset of the plurality of geographic zones that are within a geographic area covered by the first geographic zone from the first subset of the plurality of geographic zones;

request the prepared combined prediction scores for the one or more geographic zones from the second subset of the plurality of geographic zones that are within the geographic area covered by the first geographic zone from the first subset of the plurality of geographic zones; and
change a resolution of the prediction map GUI such that the user-selectable node icon representing the first geographic zone from the first subset of the plurality of geographic zones within the prediction map GUI is broken into a plurality of additional user-selectable node icons representing the one or more geographic zones from the second subset of the plurality of geographic zones and the prepared combined prediction scores are overlaid on the plurality of additional user-selectable node icons representing one or more geographic zones from the second subset of the plurality of geographic zones within the prediction map GUI.

10. The system of claim 9, wherein the at least one of the prepared combined prediction scores is transmitted from a server on a cloud computing system to the client device, and wherein the client device does not calculate the combined prediction score.

11. The system of claim 9, further comprising instructions that, when executed by the at least one processor, cause the system to prepare the plurality of household prediction scores by inputting the plurality of attributes into a machine learning model, the machine learning model being trained to output a model prediction score for a given household based on attributes associated with the given household.

12. The system of claim 9, wherein the plurality of attributes include publicly accessible data about the plurality of households.

13. The system of claim 9, wherein preparing the combined prediction score includes preparing a first combined prediction score for the first subset separately from a second combined prediction score for the second subset.

14. The system of claim 9, wherein the request associated with the geographic zone from the first subset of the plurality of geographic zones includes an index value associated with a node of a target geographic zone of the plurality of geographic zones, and wherein transmitting the at least one of the prepared combined prediction scores includes transmitting the prepared combined prediction scores associated with the index value.

15. A non-transitory computer readable medium storing instructions thereon that, when executed by at least one processor, causes one or more computing devices to:
identify a hierarchical geographical model including a plurality of geographic zones, wherein the hierarchical geographical model includes a first tier and a second tier, the first tier including a first subset of the plurality of geographic zones and the second tier including a second subset of the plurality of geographic zones wherein the first subset of the plurality of geographic zones have a larger geographic area than the second subset of the plurality of geographic zones;
receive a plurality of household prediction scores for a plurality of households based on a plurality of attributes;
for each geographic zone of the plurality of geographic zones, prepare a combined prediction score based on household prediction scores of the plurality of households that reside within the geographic zone;

based on a request from a client device associated with a geographic zone from the first subset of the plurality of geographic zones, transmit the prepared combined prediction score for the geographic zone from the first subset of the plurality of geographic zones;

detect a user manipulation of a user-selectable node icon associated with the first subset of the plurality of geographic zones in a prediction map GUI displayed on the client device that decreases a displayed geographic area within the prediction map GUI, wherein the user manipulation of the user-selectable node icon comprises a zoom-in interaction;

determine one or more geographic zones from the second subset of the plurality of geographic zones that are within a geographic area covered by the geographic zone from the first subset of the plurality of geographic zones;

transmit the prepared combined prediction scores for the one or more geographic zones from the second subset of the plurality of geographic zones that are within the geographic area covered by the geographic zone from the first subset of the plurality of geographic zones; and change a resolution of the prediction map GUI such that the geographic zone from the first subset of the plurality of geographic zones within the prediction map GUI is broken into the one or more geographic zones from the second subset of the plurality of geographic zones and the prepared combined prediction scores are overlaid on the one or more geographic zones from the second subset of the plurality of geographic zones.

16. The non-transitory computer readable medium of claim 15, wherein the prepared combined prediction score for the geographic zone from the first subset of the plurality of geographic zones is transmitted from a server on a cloud computing system to the client device.

17. The non-transitory computer readable medium of claim 16, further storing instructions thereon that, when executed by at least one processor, causes one or more computing devices to, in response to an additional detected user manipulation of the user-selectable node icon associated with the first subset of the plurality of geographic zones in the prediction map GUI displayed on the client device that increases the displayed geographic area within the prediction map GUI:

transmit an updated combined prediction score for the geographic zone from the first subset of the plurality of geographic zones; and change the resolution of the prediction map GUI such that the one or more geographic zones from the second subset of the plurality of geographic zones within the prediction map GUI are collapsed into the geographic zone from the first subset of the plurality of geographic zones and the updated combined prediction score for the geographic zone from the first subset of the plurality of geographic zones are overlaid on the geographic zone from the first subset of the plurality of geographic zones.

18. The non-transitory computer readable medium of claim 15, wherein the plurality of attributes include publicly accessible data about the plurality of households.

19. The non-transitory computer readable medium of claim 15, wherein the plurality of attributes include personal information, the personal information including name, age, race, gender, phone number, email address, mortgage status, home type, or home composition.

20. The non-transitory computer readable medium of claim 15, wherein determining the combined prediction score includes pre-calculating a first combined prediction score for the first subset separately from a second combined prediction score for the second subset.

* * * * *